(No Model.) 2 Sheets—Sheet 1.
J. BARTLETT.
TEMPERATURE OR PRESSURE INDICATOR.
No. 531,763. Patented Jan. 1, 1895.
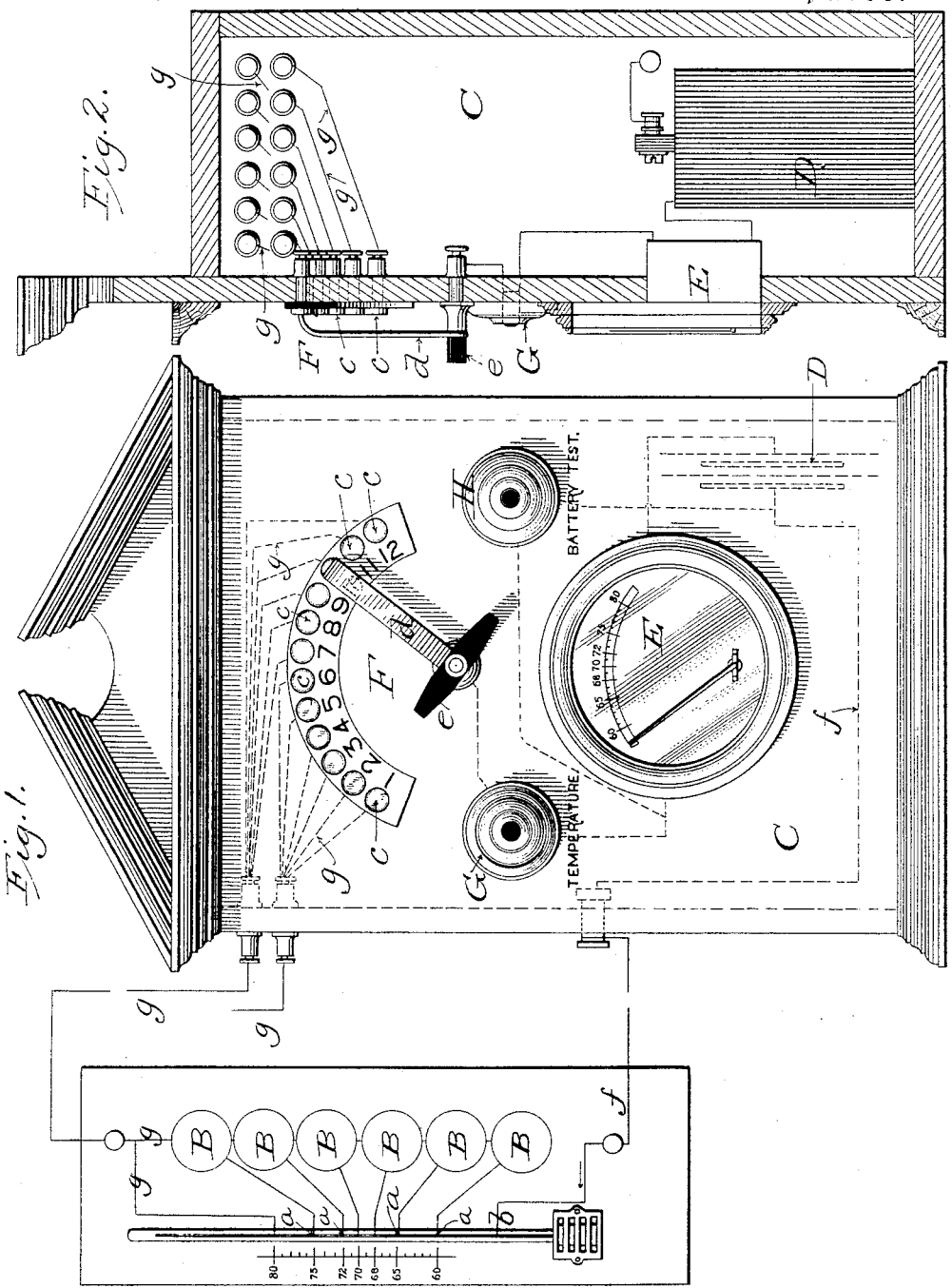

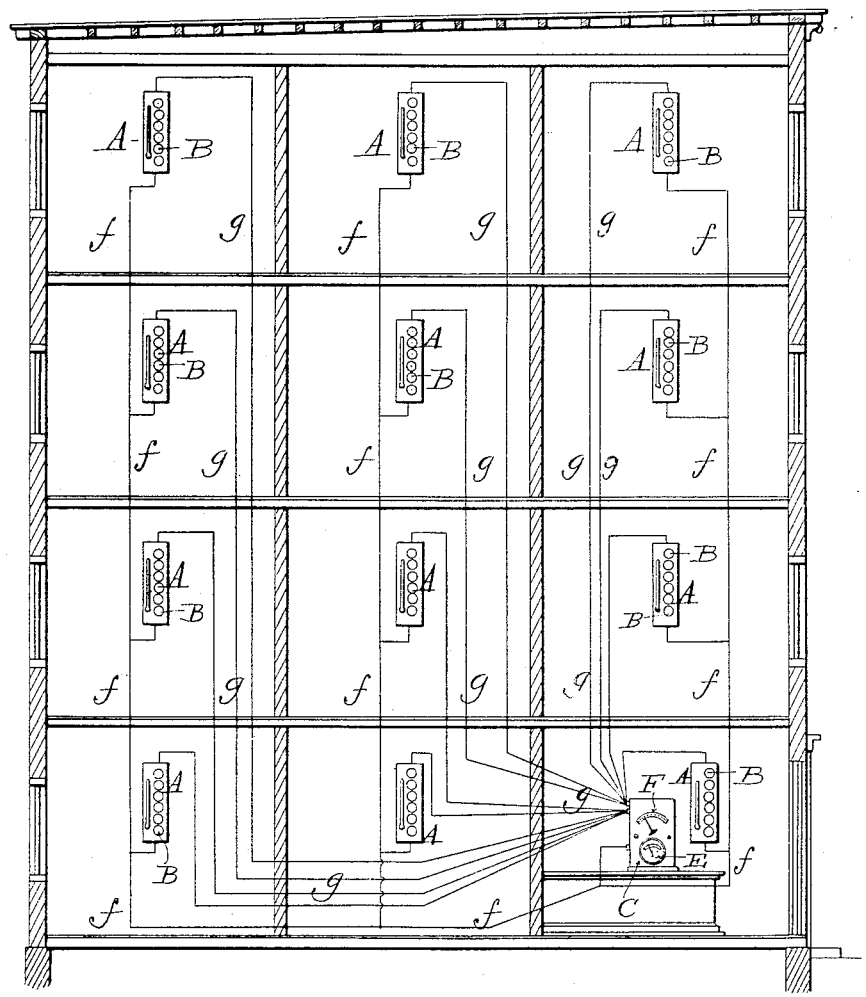

UNITED STATES PATENT OFFICE.

JAMES BARTLETT, OF TOLEDO, OHIO.

TEMPERATURE OR PRESSURE INDICATOR.

SPECIFICATION forming part of Letters Patent No. 531,763, dated January 1, 1895.

Application filed July 30, 1894. Serial No. 518,977. (No model.) Patented in England January 17, 1893, No. 985.

*To all whom it may concern:*

Be it known that I, JAMES BARTLETT, a citizen of the United States, residing at Toledo, in the county of Lucas and State of Ohio, have invented certain new and useful Improvements in Temperature or Pressure Indicators, (for which I have received British Letters Patent No. 985, dated January 17, 1893,) of which the following is a specification.

My invention relates to apparatus for indicating at one place, the temperature pressure or like condition existing at another place, and is designed more particularly for use in school buildings, hotels and other structures, cold storage warehouses, mines, &c., in which the regulation of temperature, ventilation, or both is effected from a single point.

The invention consists in the combination of a temperature or pressure-measuring device, such as a thermometer or barometer, provided with a series of electrical contacts each furnished with an electrical resistance; a source of electric energy; an electric conductor or circuit including or connecting with the several resistances and the source of energy; and a galvanometer or like instrument likewise included in the circuit; the arrangement being such that variations of temperature or pressure shown by the measuring instruments shall cause more or less of the resistances to be included in circuit with the galvanometer, and thereby cause the galvanometer to indicate corresponding variations upon its scale or dial.

The invention further consists in other features and details hereinafter pointed out.

In the accompanying drawings,—Figure 1 is a front elevation of my improved apparatus, the two parts being brought close together for convenience of illustration and explanation; Fig. 2, a vertical section through the indicator box from front to rear; Fig. 3, a diagrammatic view illustrating the manner of applying and using the apparatus in a building containing a number of rooms.

The purposes of my invention are to enable the janitor or superintendent of a building, warehouse, mine or like place to readily ascertain at any moment the temperature, barometric pressure or other like condition obtaining in any given room or portion of the building, and to accomplish this result without undue complication of apparatus.

With these objects in view I provide first a measuring instrument A, Fig. 1, suited to the particular result in view, and here represented as a mercurial thermometer. Whatever be the form of this device, it is furnished with a series of electrical contacts $a$, $a$, with which the movable member of the instrument makes contact successively, as the temperature or pressure rises or falls.

When an instrument containing a mercurial column is employed, the contacts $a$, $a$, may consist simply of wires passing through the side or wall of the tube and entering the bore thereof, so that the mercury column shall make contact with all such as are at any given time within its length or height, care being of course taken to use iron or other wires which will not amalgamate with the mercury.

Each wire or other contact $a$ of the series, except the last, extends to and connects with an electrical resistance B, which may be a coil of German-silver wire, or any other well known substitute therefor, the several resistances being preferably connected in series.

The wires $a$ entering the tube, or the contacts, are located at points corresponding with the maximum and minimum limits within which variation will ordinarily occur or be permitted, and at intermediate points, the limits indicated in the drawings being 60° and 80° respectively. These limits are purely optional of course.

In addition to the contacts $a$, $a$, and at a point below them in the case of a mercury-column instrument, is a similar contact $b$, Fig. 1, which is placed in such position as will insure permanent contact with the mercury column or other movable indicator of the measuring instrument A.

The measuring instrument A, of whatever kind adopted, is placed in the room or apartment the condition of which is to be ascertained and indicated at some other point; or one such instrument is placed in each room or at each point concerning which such information is desired, as illustrated in Fig. 3.

C represents the box or casing of an indicating apparatus, designed to be placed in the room of the janitor, superintendent, fireman or other person having charge of the regulation of temperature, ventilation or the like for the apartments provided with the instruments A.

The box or casing may be of any suitable form and dimensions, and contains a galvanic battery D, or other source of electric energy; a galvanometer E, and means for closing the battery circuit through the galvanometer and the instrument A of any particular apartment or place.

When two or more measuring instruments A are employed, I provide, preferably, two distinct circuit closers F and G, the first adapted to make contact with the particular one of a series of buttons or studs c in electrical connection with the instrument A selected, and the second serving to complete the battery circuit after the preliminary contact is made by the circuit closer F.

The circuit closer F, Figs. 1 and 2, comprises, in addition to the series of contact buttons or studs c already mentioned, a swinging or movable arm d, provided with a suitable hand-piece e for adjusting it, the arm d being made of suitable conducting material, and connected in circuit with one terminal of the galvanometer coil, the other terminal of which latter connects with a terminal of the battery or supply D, Figs. 1 and 2. From the terminal of battery or supply D a wire or conductor f passes to the contact b of each of the measuring instruments A, suitable branches being made from conductor f where necessary.

The studs or buttons c of the indicator are arranged in the arc of a circle, or in such other order as shall insure proper contact of the arm d therewith as said arm is moved, and each stud is numbered or otherwise marked to correspond with the room or point for which it stands.

From each button or stud c a wire or conductor g extends to the instrument A in the room or at the place indicated by the number or marking of such button, the wire g branching or dividing and running to the upper contact a and to the terminal of the upper resistance B of the series, as plainly shown in Fig. 1. It will thus be seen that there is a separate wire or conductor from the indicator instrument C to each room or point provided with a measuring instrument, and a return wire common to all.

Circuit closer G is here represented as of the ordinary push button type, and may be introduced at any convenient point in the circuit. It is represented as located between the galvanometer E and arm d of circuit closer F.

The operation of the apparatus is as follows, it being of course understood that the circuit is normally open and the galvanometer pointer is normally at one extreme of its range of movement: The janitor or other person desiring to ascertain the condition of a given room, say the temperature of room 10, turns the handle e until bar d rests upon button c of that number, and then presses the button of circuit closer G. The circuit is thus completed from battery or supply D to the galvanometer E, to circuit closer G, to arm d of circuit closer F, to contact button 10, and thence by wire g to instrument A of room 10, thence through or around more or less of the resistances B according to the height of the column, to contact b, to wire f, and by this back to battery, provided the mercury column reaches the lower contact a. Assuming that the mercury column does not reach the lowest of the contacts a of instrument A, the circuit will be open between said contact a and the contact b. Consequently no current will pass and the galvanometer hand will not move. If, however, the mercury column reaches one of the contacts a, say the one corresponding to 72°, the circuit will then be completed through the upper two resistances B B, the third contact a, from the top, the mercury column, to contact b, and thence back to battery. In this way the current will flow through the circuit and through the galvanometer coil therein, reduced in strength or effectiveness to the extent of the two resistances B B, and the galvanometer pointer will therefore move a distance proportionate to such strength, or to 72° on its dial, thereby indicating to the janitor or other person the temperature existing in room 10. The same operation is performed for each room, arm d being first placed upon the button c of the desired number.

When the mercury column rises to the uppermost contact a, all the resistances will be cut out; and for each lower contact in order an additional resistance will be included, so that the resistance in circuit will always be proportionate to the reading of the instrument A, and the galvanometer must of course mark in accordance with the resistance in circuit, or in other words, according to the effective strength of the current passing.

It is possible that through consumption of elements, evaporation of battery solution, or other cause, the current strength of the battery, if a battery be used, may vary at times. Hence it is advisable to provide a means of testing its strength from time to time that it may be increased if necessary. To this end I provide a third circuit closer H, which is in a special or test circuit including only the battery D and the galvanometer E, as indicated in Fig. 1. When the circuit is closed through H, the galvanometer hand should move to the farther end of the scale plate, or other predetermined point, and failing to do so, the battery strength should be increased by lowering the elements, replenishing the solution, or in any other of the well known ways, until brought to the required condition. A rheostat may likewise be included in the battery circuit to reduce the effective current in the event of its being greater than required.

It is manifest that the construction and character of instrument A is immaterial, provided only its movable or indicating member be arranged to make electrical connection with contacts a in the manner indicated. Thus, for instance atmospheric pressure will be indicated in precisely the same manner if the instrument A be a mercurial barometer, or an aneroid barometer. So too, a bimetallic thermostat, a pressure gage or any equivalent or analogous measuring instrument serving to make the necessary connection with contacts *a*, may be used, according to the nature of the information desired to be conveyed. It is therefore to be understood that the instrument A is typical or representative of measuring instruments generally.

Measuring instruments of all kinds, including pressure gages, hygrometers, pyrometers, &c., having heretofore been frequently constructed to make varying or successive electrical contacts or connections, and being well known in the arts, it is deemed unnecessary to show them in the drawings. So too, the common plan of producing separate resistances by making separate electrical connections with different portions of a continuous coil or bar, may be adopted, the form of resistance being wholly immaterial.

It is not essential that the circuit closer G be used.

It is of course obvious that the current may proceed in either direction from the battery according to the manner in which it is connected or coupled. It is likewise manifest that a resistance may be included in circuit with the last of the contacts *a* of the circuits, though this is unnecessary and ordinarily undesirable.

Having thus described my invention, I claim—

1. In combination with a measuring instrument such as a thermometer or barometer, provided with a series of electrical contacts adapted to be closed by movement of the indicating member of said instrument, a series of resistances each connected with one of said contacts, a galvanometric indicator, a source of electric energy, and an electric conductor or circuit including the source of energy, the indicator, the movable member of the measuring instrument, and the contacts, substantially as and for the purpose set forth.

2. In combination with a measuring instrument A, provided with a movable indicator and with a series of contacts *a*, a series of resistances B electrically connected with the contacts *a*, a source of electric energy D, a galvanometric indicator E, and a conductor or electric circuit connecting the battery, the indicator, the movable member of the measuring instrument and the resistances, whereby the movable member of the measuring instrument is caused to complete a circuit through one or another of the contacts and through more or less resistance, and thereby to determine the showing of the indicator.

3. In combination with measuring instrument A provided with contacts *a* and *b*, and with a movable member adapted to make electrical connection with said contacts, a resistance B connected at different points with the contacts *a*, a galvanometer E, a battery or source of electric supply D, and conductors *f* and *g* connecting the battery and the galvanometer in circuit with the measuring instrument and the resistance substantially as shown and described.

4. In combination with a measuring instrument as A, provided with a movable member and with a series of electrical contacts therefor, resistances B electrically connected with said contacts, a source D of electric energy, a galvanometer, an electric conductor or circuit including the source of electricity, the galvanometer, the measuring instrument, and the resistances, and a normally open manual circuit closer for completing the circuit when required.

5. In combination with a series of measuring instruments each provided with a movable member and with a series of electrical contacts therefor, a resistance connected with the contacts of each measuring instrument, wires or conductors extending from the resistances of each measuring instrument to contact studs or buttons at a central station, a manually-controlled contact maker movable at will to any one of said studs, a source of electric energy, a galvanometric indicator, and conductors connecting the movable member of the measuring instrument, the source of energy, the galvanometric indicator, and the said manually-controlled contact maker, all substantially as set forth, whereby the circuit may be closed through any one of the measuring instruments at will, and its reading indicated by the galvanometric indicator.

6. In combination with an indicating apparatus such as described, comprising a measuring instrument, a battery or source of electric energy, and a galvanometric indicator in circuit with the measuring instrument and source of energy,—a separate circuit including the source of energy, the indicator and a circuit closer but excluding the measuring instrument,—whereby the strength of current may be tested when desired.

7. In combination with a series of measuring instruments, contacts and resistances such as described; a source of electric energy; a galvanometric indicator, and conductors connecting the indicator and source of energy with each of the measuring instruments; two circuit closers included in circuit with the source of energy, the first adapted to close a circuit from the second to the particular measuring instrument desired, and the second adapted to complete the circuit from the first to the source of energy.

In witness whereof I hereunto set my hand in the presence of two witnesses.

JAMES BARTLETT.

Witnesses:
E. B. BARTLETT,
JULIA BARTLETT.